Figure 1:
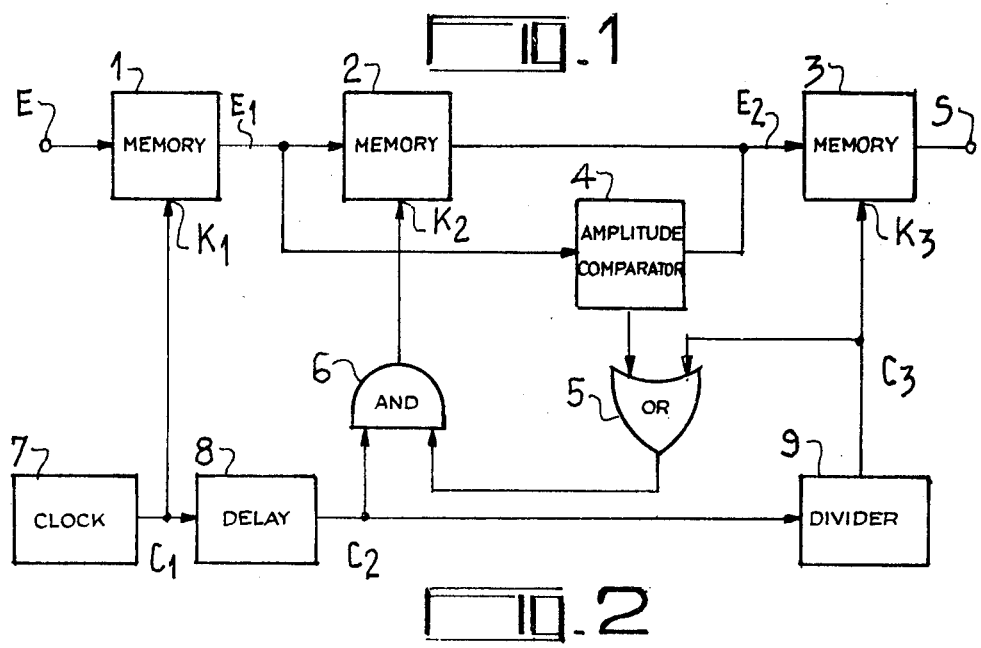

United States Patent [19]
Baron

[11] 4,053,840
[45] Oct. 11, 1977

[54] BAND COMPRESSION DEVICE

[75] Inventor: Jean-Claude Baron, Paris, France

[73] Assignee: Thomson-CSF, Paris, France

[21] Appl. No.: 709,109

[22] Filed: July 27, 1976

[30] Foreign Application Priority Data

Aug. 1, 1975 France .................................. 75.24148

[51] Int. Cl.² ........................... H03K 5/20; H04B 1/66
[52] U.S. Cl. ............................... 328/151; 179/15 BW;
179/15.55 R; 307/353; 307/358; 328/115;
333/14
[58] Field of Search ........... 307/235 A, 235 B, 235 C,
307/235 J; 328/115–117, 151; 333/14; 358/138,
260; 179/15 BW, 15.55 R

[56] References Cited

U.S. PATENT DOCUMENTS 3,932,767 1/1976 Gomm et al. ..................... 328/151 X Primary Examiner—John Zazworsky
Attorney, Agent, or Firm—Cushman, Darby & Cushman

[57] ABSTRACT

The disclosure relates to band compression devices. The input signals are sampled and stored in at least two memories. In a sequence of $n$ samples, two samples are taken in pairs, compared and the greatest of them is transferred to an output memory from which it can be read for a period equal to or less than the duration of the sequence. When using a non-shifting mode, the output memory is reset at the end of each sequence of $n$ samples. A shifting mode is used in a device comprising a plurality of identical stages connected in series, where each new sample is transmitted to the next stage only if it is greater than the previous stored sample in each stage.

9 Claims, 6 Drawing Figures

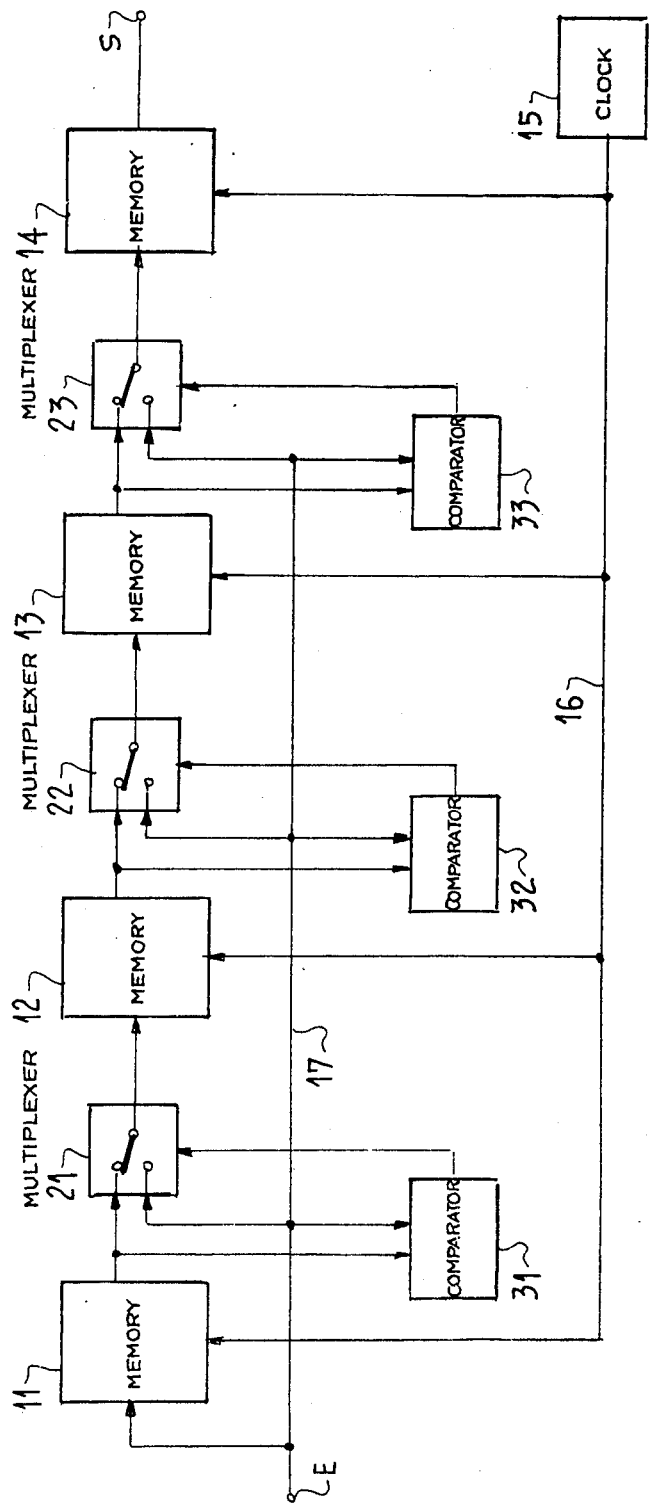

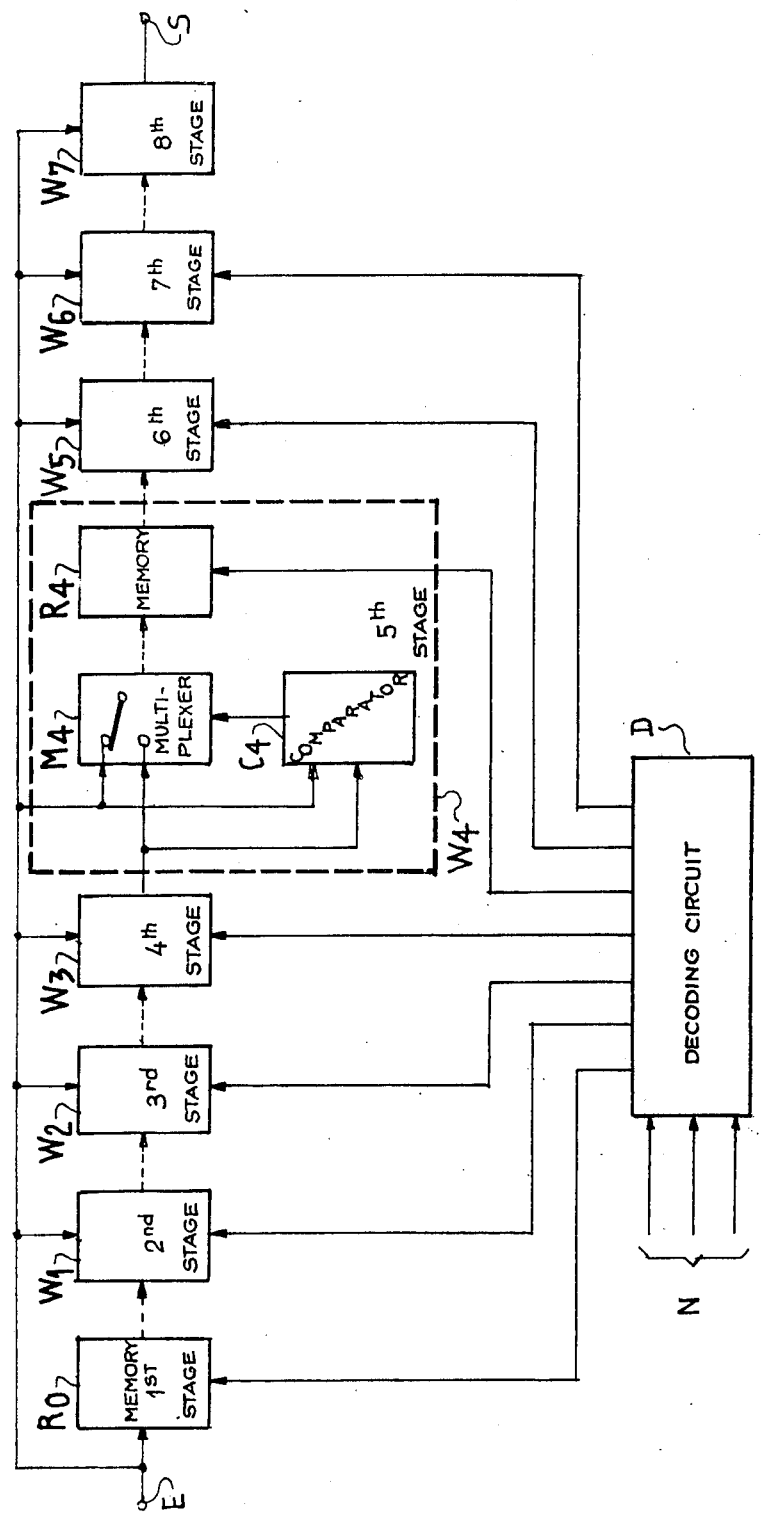

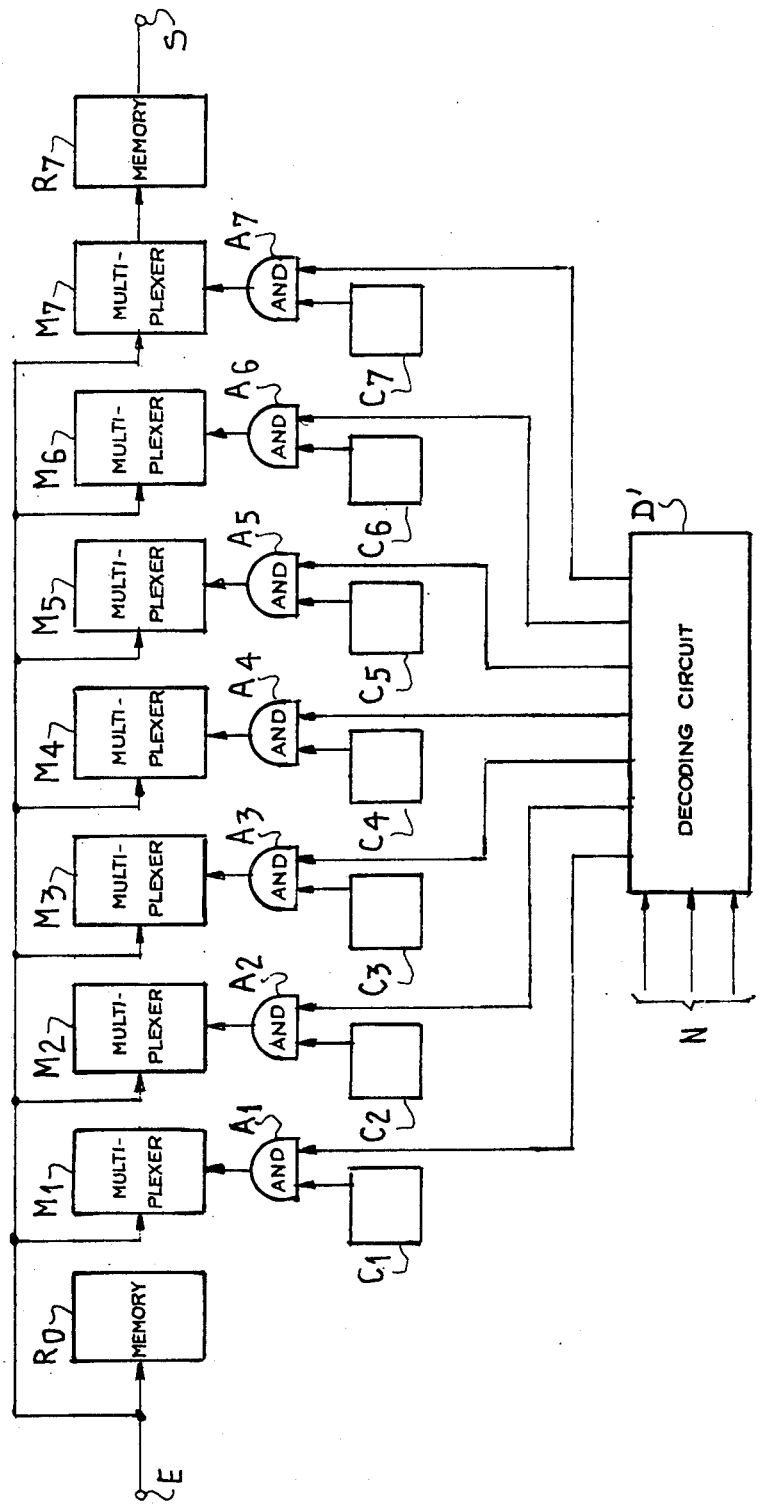

BAND COMPRESSION DEVICE

The invention relates to band compression devices and more particularly to those which can be used in active detection systems such as radars or lidars.

It is in fact known that to distinguish a target of small surface area from surroundings which reflect interference echos, it is necessary to increase the resolution of the detection system. Resolution may be increased in particular by reducing the duration of the transmitted pulses. This method improves the ratio between the amplitude of the useful signal and the amplitudes of the interference echos caused by the surroundings. It also provides greater accuracy in range measurement. On the other hand however, the pass band of the video signals supplied by the receiver is wider. Generally, in such applications, high precision performance is not required. Similarly, the probability of two targets present in the beam from the antenna being very close together is virtually nil. All that is required is sufficient contrast between the echos from targets and the surrounding interference echos.

To take full advantage of this contrast, the operating devices which follow the receiver need to have a pass band at least equal to the spectral width of the video. This is not normally possible when the operating device incorporates a conventional cathode ray display or any other device intended for use by a human operator. The pass band of such device is less than that of the video signals from the receiver and it is found necessary to insert a band compression device between the receiver and the operating device to reduce the loss of contrast which would result from the mismatch.

One object of the invention is thus to make use of such a band compression device. If the useful signals are short pulses, the compression takes the form of an increase in the duration of the pulses.

There are two distinct kinds of band compressor:

Linear compressors which follow the principle of superimposition and in which the product of the duration of the signals multiplied by their pass band is held constant.

Non-linear compressors which do not observe the above principle and which are used in particular in radar signal extractors, redundancy eliminating arrangements, transverse filters, etc.

The present invention relates to the second kind of compressor.

The principle adopted derives from the fact that the information or useful data content is less than the transmitting capability of the detection system and that the useful data is characterized by power levels higher than those of the interference data.

In accordance with the invention, there is provided a band compression device comprising sampling means for sampling input signals, storing means for storing at least two successive samples, comparing means for comparing said samples taken in pairs from a series of $n$ successives samples so as to extract that sample whose amplitude is greatest, an output memory and control means for transferring in response to said comparison the said greatest sample to said output.

Use may be made of the invention in two different ways.

In a first embodiment using a non-shifting mode, a comparator circuit compares the value of the sample recorded in a first memory with the value of the previous sample recorded in a second memory. The sample of higher value is then transferred to the second memory and can be compared with a subsequent sample which is transferred to the first memory.

At the end of a series of $n$ samples, the sample stored in the second memory is transferred to a third memory where it remains until the end of the next series.

In a second embodiment using a shifting mode, $n$ memories are connected in series. Each memory is associated with a comparator which compares the value of the sample in store with those of the samples applied to the input of the device. The sample whose value is highest is transferred to the next memory and the operation recommences on the arrival of each subsequent sample.

In both modes the compressed signals are output by the last store.

Figure 2:
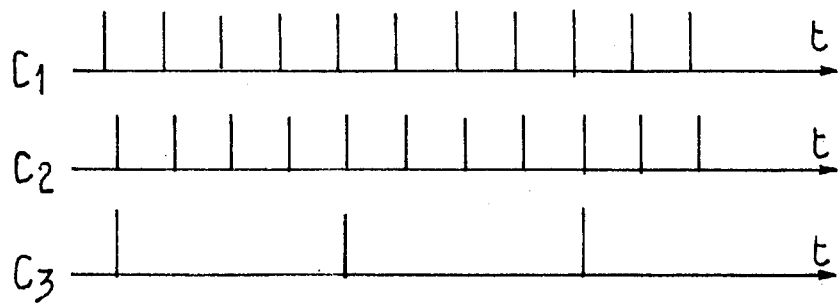
Figure 3:
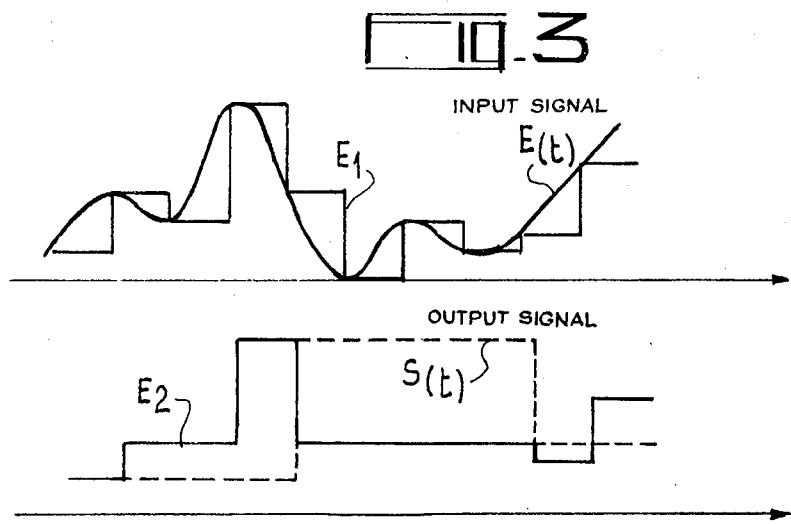

Other special features and advantages of the invention will become apparent from the following description. The Figures which accompany it show:

FIG. 1, an embodiment of the invention employing the non-shifting mode;

FIG. 2, the control signals for the circuits in FIG. 1;

FIG. 3, the amplitudes of the signals at various points in the circuits of FIG. 1;

FIG. 4, an embodiment of the invention which employs the shifting mode, and

FIGS. 5 and 6, improvements to the arrangement of FIG. 4.

FIG. 1 shows an embodiment of a band compression arrangement which employs the non-shifting mode.

It includes three memory circuits 1, 2 and 3 which are connected in series. The input E of the arrangement is connected to memory 1 and its output S to memory 3. The memories have control inputs K1, K2 and K3 respectively. When a control signal (generally a pulse) is applied to a control input, the signal present at the input of the relevent memory is written into store in place of the signal which was in store before the arrival of the control signal. The various memories are controlled from a clock circuit 7 which is connected in series with a delay circuit 8 and a divide-by-N circuit 9. Memory 1 is controlled directly by time 7. Memory 3 is controlled by divider 9. Memory 2 is controlled from an AND circuit 6 whose two inputs are connected to the output of delay circuit 8 and the output of an OR circuit 5 respectively. The two inputs of the OR circuit are connected respectively to the output of divider 9 and to the output of an amplitude comparator 4 which is connected to the outputs of memories 1 and 2.

FIG. 2 shows the control signals C1, C2 and C3 which are produced by timer 7, delay circuit 8 and divider 9 respectively.

FIG. 3 shows an input signal E(t) as a solid line. Signal S(t) represents the output from memory 3 (a broken line), signal E1 the output from memory 1 has signal E2 the output from memory 2.

The operation of the compression arrangement is as follows:

The sampling performed on the input signal E(t) converts it, at the output of memory 1, into a succession of square wave pulses whose duration needs to be less than half the reciprocal of the bandwidth of signal E(t) in order to satisfy the requirements of the Shannon sampling formula. Memory circuit 1 records the instantaneous value of the input signal at the time of each control pulse C1. Comparator circuit 4 then compares the value recorded in memory 1 with the value stored in memory 2. When the recorded value is greater than the stored value, the value recorded in memory 1 is stored in memory 2 by means of a control signal C2 coming via AND circuit 6.

After N samples, the value stored in memory 2 is transferred to memory 3. In this way, the highest value found among N successive samples is held at the output of the arrangement, as shown in FIG. 3, where the delay between signals C1 and C2 is ignored for the sake of clarity.

The two-input OR circuit 5 receives both the output signal from comparator 4 and that from divider 9 and controls memory 2 in synchronisation with signals C2 by virtue of AND circuit 6. At the end of the series of N pulses of C2, memory 2 thus records the value of the first sample in the next series.

The duration of the output signals is thus equal to N times the sampling period.

Memories 1 to 3 may equally well be analogue or digital memories. If analogue techniques are used, the memories are formed by sample and hold circuits and the comparator is in the form of a differential amplifier. In the case of digital techniques, the memories are buffer registers having parallel inputs and outputs. If the input signals are analogue signals, memory 1 is formed by an analogue/digital encoder, the sampling pulses being provided by clock 7. The other circuits, namely the clock, delay circuit and divider employing digital techniques will be familiar to the man skilled in the art.

The arrangement shown in FIG. 1 is simple, but has a drawback however, which arises from the fact that the output signal only appears at the time of the next series of N samples.

This drawback does not exist with the shift-sequence band compressing arrangement shown in FIG. 4.

In this arrangement, the items of information presented are combined into groups of four, the number four being taken only as an example. The rate at which information is applied to input E is synchronised with a clock circuit 15. This clock controls the recording in four memory circuits 11, 12, 13 and 14 of the item of information presented to their respective inputs. These memories are formed by parallel registers having a capacity of p bits which are able to record binary signals containing a maximum of p bits. Clearly, other kinds of memory may be used, as well as a greater or lesser number of memories.

The compression ratio of the arrangement is equal to the number of memories used in cascade, whereas in the case of FIG. 1 it was equal to the ratio of division of the timing pulses applied to the third memory. In the case of FIG. 4, the ratio of four has been selected merely as an example.

The input samples applied to terminal E are transmitted on the one hand to the memory 11 and on the other hand to three multiplexer circuits 21, 22, 23. Multiplexer 21 thus has a first input which receives samples via a connection 17 from input terminal E and a second input connected to the output of memory 11. A second memory 12 is connected to the output of multiplexer 21. A comparator 31 connected to both inputs of multiplexer 21 operates the multiplexer in such a way that it transmits that item of information whose amplitude is the greater to memory 12. A second multiplexer 22 associated with a comparator 32 is connected to input E by connection 17 and to the output of memory 12. It transmits the greater item of information to a third memory 13. The same arrangement is repeated a third time in the case of a third multiplexer 23 which is connected to the output of memory 13 and to input E, to a third comparator 33 and to a fourth memory 14.

The manner in which the arrangement operates is as follows:

Each item of information $En$ received is written into memory 11. The next item of information $En + 1$ is compared with item $En$ by comparator 31. The greater of the two is then written into memory 12. The latter thus contains the greater of two successive items of information received. The next information item $En + 2$ is then compared with the greater of items $En + 1$ and $En$. Memory 13 thus contains the greatest of three successive items of information received. On the same principle, memory 14 will then contain the greatest of four successive items of information received.

The advantage of this compressing arrangement is that the items of information of greatest amplitude are transmitted immediately to the output S of memory 14.

To increase the number of items of information combined into a group, it is merely necessary to insert additional stages in cascade, a stage consisting of a multiplexer, a comparator and a memory.

As in the case of FIG. 1, the compressing arrangement in FIG. 4 may contain analogue or digital circuits. It is particularly easy to produce a digital compressor since memories, multiplexers and comparators are currently available in the form of digital integrated circuits.

In certain applications it may be useful to change electronically the compression ratio, that is to say the number of items of information combined into a group. It is therefore necessary to change the number of stages used.

In practice, the arrangement contains a number of stages equal to the highest compression ratio required. Lower compression ratios are obtained by reducing the number of stages used.

Referring to FIG. 4, a first possibility consists of connecting output S not to the output of memory 14, but instead to that of memory 13 or memory 12 to obtain compression ratios of 3 and 2 respectively. In this case the operation of the first stages remains unaffected. The latter stages are not used.

Another possibility is shown in FIG. 2. Here it is the first stages which are not used, which is done by forcing the items of information to arrive directly at a given intermediate stage.

This compressing arrangement is capable of having a compression ratio of 8. To this end, it contains seven stages W1 to W7 which are connected downstream of an input memory Ro which is the first stage. For reasons of simplicity, all the comparators and multiplexers have not been shown but they are connected as in FIG. 4. Only stage W4, for example, which has a multiplexer M4 associated with a comparator C4 and a memory R4 has been shown in detail. A decoding circuit D having three binary inputs and eight outputs receives at its binary inputs the value N of the desired compression ratio. The seven of its outputs which are used (its output corresponding to 0 is not used) are connected to the zero-reset control inputs of memories of the seven first stages respectively.

Let it be assumed that the compression ratio selected is 4. The value $N = 4$ is fed to decoder D. The output connected to the memory in stage W3 resets it to zero. Each new item of information which is compared with the content of this memory by comparator C4 is thus automatically transmitted to memory R4 as if stages W1, W2 and W3 did not exist. The compression ratio arrived at by using the last four stages is then equal to four.

FIG. 6 shows another possibility which consists in blocking one of the multiplexers. In this Figure, only the multiplexers M1 to M7 associated with the comparators C1 to C7 and the input memory Ro and the output memory R7 are shown. The memories of the other stages are not shown for the sake of clarity.

Between each comparator and each associated multiplexer is inserted a two-input AND circuit (A1 to A7). One of the inputs thus receives the control signal for the comparator and the other input is connected to a specific output of a decoding circuit D' similar to circuit D in FIG. 5.

When a compression ratio N is fed in binary form to decoder D', one of the outputs of the latter goes to the "0" state and forces the corresponding AND circuit to remain blocked in the "0" state. The associated multiplexer is thus also blocked in one position: namely that in which the input information received at terminal E is transmitted to the next memory, which is done no matter what the content of the previous memory. Since the other outputs of the decoder are in the "1" state, the remainder of the compression arrangement operates in the normal way. Thus, everything takes place as if only the last N stages of the arrangement were being used.

It is of course possible to use the more common NAND circuits in place of AND circuits, so long as allowance is made for the inversion of the signal at their outputs.

With a compression arrangement such as that shown in FIG. 1, it is also possible to vary the compression ratio, by varying the division ratio of divider 9. For this purpose, provision must be made for a programmable dividing circuit to be used.

What is claimed is:

1. A band compression device for receiving input signals of predetermined frequency bandwidth and for delivering output signals of bandwidth n times narrower comprising:
    sampling means for sampling said input signals;
    storing means for storing at least two successive samples in a series of n successive samples;
    amplitude comparing means for comparing said samples taken in pairs and for providing a logic transfer control signal depending on each of said amplitude comparisons;
    an output memory for receiving the sample greatest in amplitude in said series and delivering said output signal; and
    control means connected to said storing means, said output memory and receiving said logic control signal for transferring said greatest of the compared samples to said output memory.

2. A device according to claim 1 wherein:
    said storing means comprises a first and a second memory connected in series, and
    said amplitude comparing means comprises a comparator circuit connected to the input and output of the second memory for providing said logic control signal in the form of a sampling control signal to the said second memory when the sample at the input to the second memory is greater than that of the sample at the output of the said second memory.

3. A device according to claim 1, wherein said control means comprises clock circuit means for delivering sampling control signals to said storing means and a divider circuit connected to said clock circuit means for delivering a control signal to the output memory at the end of each series of n successive samples.

4. A band compression device comprising, in series, a first memory, second memory and an output memory, each memory having a sample control input, a comparator circuit connected to the input and output of the second memory for giving a control signal when the amplitude of the sample at the input of the second memory is greater than that of the sample at the output of said second memory, and control circuit means comprising, a clock circuit having an output, a delay circuit and a divider circuit having an output, said clock delay and divider being connected in series, said clock circuit having its output connected to the sampling control input of the first memory, said divider circuit having its output connected to the sampling control input of the output memory, and AND circuit having two inputs and its output connected to the sampling control input of the second memory, one of its inputs connected to the output of the delay circuit, and the other input connected to an OR circuit having its inputs connected respectively to the output of the comparator circuit and to the output of the divider circuit.

5. A device according to claim 4, wherein the divider circuit is programmable to allow the compression ratio to be selected.

6. A device according to claim 1, wherein said storing and comparing means comprises a plurality of identical stages connected in series, each stage comprising a memory, a two-input multiplexer and a comparator circuit connected to the the multiplexer for applying to said multiplexer a control signal so that it will transmit to its output the greatest of the two signals applied to its inputs, the input signals of the device being applied to the input of the memory of the first stage and to one input of the multiplexer of all stages, the other input of the multiplexer being connected to the output of the memory, and the output of the multiplexer of each stage being connected to an input of the memory of the next stage.

7. A band compression device for receiving input signals, comprising in series a plurality of identical stages, each stage comprising a memory, a two-input multiplexer and a comparator circuit having its inputs connected to the inputs of the multiplexer for applying to said multiplexer a control signal so that it will transmit the greatest of the two signals applied to its inputs, the output of the memory being connected to one input of the multiplexer, the other input receiving the input signals for the device, said input signals being also applied to the input of the memory of the first stage and the output of the multiplexer of each stage being connected to the input of the memory of the next stage, an output memory connected to the output of the multiplexer of the last stage and a clock circuit for applying sampling control signals to all memories of the device.

8. A device according to claim 7, further comprising a decoding circuit having its outputs connected respectively to zero reset inputs of the memories, and means for applying to the input of the decoding circuit the digital number equal to the desired compression ratio.

9. A device according to claim 8, further comprising in each stage an AND circuit which is inserted between the comparator and the control input of the multiplexer, a decoding circuit having outputs which are respectively connected to the AND circuits and an input at which the desired compression ratio is set.

* * * * *